(12) United States Patent
Marchini et al.

(10) Patent No.: US 10,059,069 B2
(45) Date of Patent: Aug. 28, 2018

(54) METHOD OF MANAGING THE FEEDING OF AN ELONGATED ELEMENT TO A TYRE BUILDING STATION

(71) Applicant: PIRELLI TYRE S.P.A., Milan (IT)

(72) Inventors: Maurizio Marchini, Milan (IT); Ivan Gildo Boscaino, Milan (IT); Marco Fabbretti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 451 days.

(21) Appl. No.: 14/654,123

(22) PCT Filed: Nov. 29, 2013

(86) PCT No.: PCT/IB2013/060510
§ 371 (c)(1),
(2) Date: Jun. 19, 2015

(87) PCT Pub. No.: WO2014/102631
PCT Pub. Date: Jul. 3, 2014

(65) Prior Publication Data
US 2015/0343730 A1   Dec. 3, 2015

Related U.S. Application Data

(60) Provisional application No. 61/756,666, filed on Jan. 25, 2013.

(30) Foreign Application Priority Data

Dec. 27, 2012 (IT) .............................. PD2012A0408

(51) Int. Cl.
*B29D 30/30* (2006.01)
*B29D 30/38* (2006.01)
(Continued)

(52) U.S. Cl.
CPC ............. *B29D 30/30* (2013.01); *B29D 30/38* (2013.01); *B65H 16/06* (2013.01); *B65H 19/126* (2013.01);
(Continued)

(58) Field of Classification Search
CPC ...... B65H 19/18; B65H 16/06; B65H 19/126; B65H 2405/422; B65H 2301/41369;
(Continued)

(56) References Cited

U.S. PATENT DOCUMENTS

| 3,859,883 A | 1/1975 | Bassett et al. |
| 3,970,261 A * | 7/1976 | McNenney ............ B29D 30/38 242/528 |

(Continued)

FOREIGN PATENT DOCUMENTS

| GB | 1 495 803 | 12/1997 |
| WO | WO 2008/152453 | 12/2008 |
| WO | WO 2009/068939 | 6/2009 |

OTHER PUBLICATIONS

International Search Report from the European Patent Office for International Application No. PCT/IB2013/060510, dated Mar. 19, 2014.

(Continued)

*Primary Examiner* — William Arauz Rivera
(74) *Attorney, Agent, or Firm* — Finnegan, Henderson, Farabow, Garrett & Dunner, L.L.P.

(57) ABSTRACT

A method for managing the continuous feeding of an elongate element wound on reels to a station for building a tire, wherein the elongate element is continuously supplied from an unwinding device of successive reels. When the terminal end of the elongate element wound on a first reel leaves said first reel, the method provides for: the first reel to be moved away from the unwinding device on a first movable carriage;

(Continued)

a second reel, successive to the first reel, and mounted on a second movable carriage, to be positioned in place of the first reel; and the terminal end of the elongate element previously wound on the first reel, to be joined to the starting end of the elongate element wound on the second reel.

23 Claims, 3 Drawing Sheets

(51) Int. Cl.
*B65H 19/12* (2006.01)
*B65H 16/06* (2006.01)
*B65H 19/18* (2006.01)
*B29D 30/00* (2006.01)

(52) U.S. Cl.
CPC ..... *B65H 19/18* (2013.01); *B29D 2030/0038* (2013.01); *B29D 2030/3064* (2013.01); *B29D 2030/3078* (2013.01); *B65H 2301/41342* (2013.01); *B65H 2301/41366* (2013.01); *B65H 2301/41369* (2013.01); *B65H 2402/64* (2013.01); *B65H 2405/422* (2013.01); *B65H 2801/93* (2013.01)

(58) Field of Classification Search
CPC ........... B65H 2301/41366; B65H 2301/41342; B65H 2402/64; B65H 2801/93; B29D 30/30; B29D 30/38; B29D 2030/3078; B29D 2030/3064; B29D 2030/0038
See application file for complete search history.

(56) References Cited

U.S. PATENT DOCUMENTS

| | | | |
|---|---|---|---|
| 4,543,149 A | | 9/1985 | Abe et al. |
| 5,358,191 A | | 10/1994 | Lundell et al. |
| 5,584,446 A | * | 12/1996 | Delmore ............... A61F 13/041 242/555 |
| 5,716,022 A | | 2/1998 | Chiloff |
| 2009/0184192 A1 | | 7/2009 | Takatsuka et al. |
| 2009/0266476 A1 | | 10/2009 | Takatsuka et al. |
| 2011/0240226 A1 | | 10/2011 | Takatsuka et al. |
| 2011/0240227 A1 | | 10/2011 | Takatsuka et al. |

OTHER PUBLICATIONS

Written Opinion of the International Searching Authority from the European Patent Office for International Application PCT/IB2013/060510, dated Mar. 19, 2014.

* cited by examiner

METHOD OF MANAGING THE FEEDING OF AN ELONGATED ELEMENT TO A TYRE BUILDING STATION

CROSS REFERENCE TO RELATED APPLICATIONS

This application is a national phase application based on PCT/IB2013/060510, filed Nov. 29, 2013, which claims the priority of Italian Patent Application No. PD2012A000408, filed Dec. 27, 2012, and the benefit of U.S. Provisional Application No. 61/756,666, filed Jan. 25, 2013, the content of each application being incorporated herein by reference.

BACKGROUND OF THE INVENTION

Field of the Invention

The present invention relates to a method for managing the feeding of an elongate element unwound from reels to a station for building tyres.

The invention further relates to an unwinding device of an elongate element wound on a reel and intended for building tyres as well as to a plant for building tyres.

Description of the Related Art

A tyre generally comprises a carcass structure which is formed toroidally about an axis of rotation and which includes at least one carcass ply which has end rims which engage in annular anchoring structures, known as "bead cores", respectively.

In a radially outer position with respect to the carcass structure, there is provided a belt structure comprising, in the case of tyres for motor cars, at least two radially superimposed strips of rubber fabric provided with reinforcement cords, usually of metal, which are arranged parallel with each other in each strip but crossed with respect to the cords of the adjacent strip, preferably symmetrically with respect to the equatorial plane of the tyre.

Preferably, the belt structure further also comprises in a radially outer position, at least at the ends of the belt strips below, a third layer of textile or metal cords which are arranged circumferentially (at 0 degrees), In tyres of the tubeless type there is further provided a radially inner layer which is referred to as a liner and which has impermeability characteristics in order to ensure the air-tightness for the tyre itself.

In a radially outer position with respect to the belt structure, there is applied a tread band which is produced from elastomer material and on which there is defined a tread surface which is intended for contact with the road surface.

A process for producing tyres provides for a first tyre building step, in which the various components of the tyre, including those set out above, are assembled in one or more budding stations so as to obtain a so-called "green" tyre, and a subsequent moulding and vulcanising step, where the green tyre is subjected to temperature and pressure values so as to vulcanise the elastomer material of the components thereof, obtaining the final structural stability of the tyre.

WO 2008/152453 discloses a forming drum which has externally a substantially cylindrical deposit surface, to which there are applied a plurality of strip-like elements which are arranged in an abutting relationship in order to form at least a first annular reinforcement layer, preferably a belt strip, on the forming drum itself.

WO 2009/068939 describes a carcass ply which is built on a forming drum by applying a plurality of strip-like elements.

SUMMARY OF THE INVENTION

The Applicant notes that those elongate elements which are cut to size, before they are used in the tyre building step, are typically stored in continuous form in suitable reels, from which they then have to be unwound in order to be fed to the specific tyre building station in which they are used. Furthermore, in order to avoid undesirable phenomena of mutual adhesion between successive turns of the elongate element wound on the reel, the elongate element is often coupled, at least at one side, to a service fabric. In order to carry out the unwinding operation of the elongate element from the reel, there are used unwinding devices which are specifically arranged to pull the elongate element from the reel, separate it from the service fabric, make it available to the budding station and, finally, collect the service fabric on a dedicated service reel.

The Applicant has noted that building lines comprising what has been described in WO 2008/152453 and WO 2009 068939 operate substantially continuously so that, in order not to slow down the rigorous tyre production times, it is necessary for each building station to be enslaved by a pair of unwinding devices, of which one is in operation and one is on standby in an alternating manner.

The Applicant has further noted that, at the time at which the elongate element finishes on the reel being unwound on the device being processed, it is possible to carry out immediately the start-up of the unwinding device on standby, after a connection between the head and tail ends of the elongate element of the reel already unwound (empty) and the reel to be unwound (new). Subsequently, there is provision for the replacement, on the unwinding device of the empty reel with another new reel and the unwinding device is left in standby mode, ready for a subsequent replacement operation.

The Applicant has noted that the presence of two unwinding devices for each building station supplied by elongate elements has a non-negligible, effect on the overall production costs because, in addition to the high initial investment in terms of machinery, it also involves a subsequent high cost in terms of maintenance.

Furthermore, the Applicant has established that this process has a relevant impact in terms of plant layout because it requires a large amount of plant surface-area.

The Applicant has further noted that the reels which are moved to the unwinding devices have weights and dimensions which are particularly considerable which may be awkward for the assigned operators for the step of replacing an empty reel with a new reel.

On the basis of those observations, the Applicant has identified a need for reducing the number of enslaved unwinding devices at each building station fed by an elongate element so as to advantageously lead to an optimisation of the production cycle with immediate reductions both in terms of production costs and in terms of control of the plant machinery.

In order to provide a positive response to this need, the Applicant has begun a detailed examination of the performance of the unwinding device and has perceived that an unwinding device may be functionally subdivided into a first device portion which is substantially independent of the reel being processed and not affected directly by the optional replacement thereof, and a second device portion which is directly affected by the replacement steps of the reel.

Therefore, the Applicant has found that it is possible to keep the first device portion fixed in position and to make the second unwinding device portion movable in such a manner that, when an empty reel is replaced, the entire second portion of the unwinding device is replaced in addition to the reel itself.

In particular, in a first aspect thereof, the invention relates to a method for manacling the continuous feeding of an elongate element wound on reels to a station for building a tyre.

Preferably, said elongate element is continuously supplied from an unwinding device of successive reels.

Preferably, when the terminal end of said elongate element wound on a first reel leaves said first reel, said first reel is moved away from said unwinding device on a first movable carriage.

Preferably, a second reel, successive to the first reel and mounted on a second movable carriage, is positioned in place of said first reel.

Preferably, said terminal end of the elongate element previously wound on said first reel is joined to the starting end of the elongate element wound on said second reel.

The Applicant believes that, for each building station, at least one fixed portion of an unwinding device is saved, with a resultant reduction in the number of machines necessary for supplying the elongate element to the tyre building station and with a reduction in the area of the plant necessary for positioning the machines themselves.

In a second aspect thereof, the invention relates to a tyre building process.

Preferably, said process comprises continuously supplying an elongate element to a station for building said tyre, by a temporary bunching system of said elongate element and unwinding said elongate element from a first reel mounted on a first movable carriage.

Preferably, the process comprises detecting a terminal end of said elongate element unwound from said first reel and locking said elongate element at said terminal end.

Preferably, there is provision for moving away said first movable carriage, on which said first reel is mounted, and for it to be replaced with a second movable carriage, on which there is mounted a second reel, in which said elongate element is wound.

Preferably, there is provision for joining a starting end of said elongate element of said second reel to the terminal end of said elongate element of said first reel and unwinding said elongate element wound on said second reel.

In a third aspect thereof, the invention relates to an unwinding device of an elongate element wound on a reel for building tyres.

Preferably, said unwinding element comprises a first support for a first reel, on which said elongate element is wound, said first support allowing rotation of said first reel about an axis of rotation thereof.

Preferably, said unwinding element comprises a processing unit of said elongate element, said unit being arranged to continuously supply said elongate element to a building station of said tyre.

Preferably, said processing unit comprises a plurality of rotating rollers over which said elongate element is led in exit of said first reel.

Preferably, said processing unit comprises a locking mechanism of said elongate element arranged to lock a terminal end of said elongate element being at the exit of said first reel.

Preferably, said processing unit comprises a temporary bunching system for said elongate element capable of allowing the continuous supplying of said elongate element, while said terminal end is locked and is joined to a starting end of said elongate element wound on a second reel supported by a second support which allows the rotation of said second reel about an axis of rotation thereof.

Preferably, said first and second supports for said first and second reels are housed on a first and a second movable carriage, respectively, which can be individually associated with said processing unit and moved independently with respect thereto.

The Applicant believes that, with an unwinding device having the features set out above, it is possible to carry out the method and the process described above, reducing the number of machines involved in the step for supplying a tyre building station and therefore optimising costs and the plant layout, without in any manner impairing the cycle times for building the tyre.

In a fourth aspect thereof, the invention relates to a plant for building a tyre.

Preferably, said building plant comprises a building station, wherein an elongate element is applied to the radially outer surface of a forming drum or of a component of said tyre arranged on said forming drum.

Preferably, said building plant comprises an unwinding device associated with said building station for unwinding said elongate element from reels arranged in succession and continuously feeding said building station.

Preferably, said unwinding device is constructed according to the above description.

The present invention in at least one of the aspects thereof may have at least one of the preferred characteristics set out below.

In a preferred embodiment, prior to the exit of said terminal end, said elongate element unwound from said first reel fills a temporary bunching system positioned upstream of said building station.

This advantageously allows relative independence of the capacity to supply elongate element to the building station from the instantaneous speed of unwinding of the elongate element from the reel to be obtained.

Preferably, at the exit of said terminal end, said elongate element unwound from said first reel, is locked at said terminal end, and said building station is supplied by said temporary bunching system.

In that manner, the connection operation between said terminal end and the starting end of the elongate element wound on the second reel is simplified.

Preferably, said terminal end of the elongate element exiting said first reel is joined to said starting end of the elongate element wound on said second reel in a time shorter than the time for emptying said temporary bunching system.

This ensures the feed of the elongate element to the building station during the reel changing step.

In a preferred embodiment, said first and second reels are mounted and dismounted on said first and second movable carriages, respectively, in a storage warehouse for said reels.

In this manner, the plant area is not taken up for the loading/unloading step of the reel, keeping only one reel being processed in the work area.

Preferably, said elongate element wound on said first or second reel is coupled to a service fabric, said service fabric is separated from said elongate element, once unwound from said first or second reel, at said first or second carriage.

In a greatly preferred manner, said service fabric, after being separated from said elongate element, is wound on a service reel mounted on said first or second carriage, respectively.

In this manner, together with the first empty reel, it is also possible to remove from the unwinding device the service fabric previously associated to the elongate element.

Preferably, said first and second movable carriages can be associated with said processing unit at a seat defined on a fixed frame of said processing unit.

In a preferred embodiment, respective fastening elements are provided on said first and second movable carriages and said fixed frame for removably fixing said first and second movable carriages to said processing unit at said seat.

This advantageously allows correct positioning of the movable carriage with respect to the fixed frame and prevention of undesirable movements between the reel being unwound and the processing unit of the elongate element unwound therefrom.

Preferably, said fastening elements comprise wedge-shaped couplings.

In this manner, there is obtained the centering of the fastening elements so as to facilitate the correct positioning of the movable carriage inside the seat.

Preferably, guide rollers are provided on said fixed frame or on said first or second movable carriage to guide said first and second movable carriages away from and towards said seat.

In this manner, the inlet into the seat of the movable carriage and the exit therefrom are promoted in order to accelerate to the greatest possible extent the replacement of the first movable carriage by the second movable carriage.

Preferably, said first and second movable carriages comprise a plurality of wheels resting on the ground, a bearing structure on which the first or second support for said reels are mounted, as well as a lifting mechanism for lifting and lowering said bearing structure relative to said wheels.

As a result of this feature, it is possible to also use the movable carriage to facilitate the loading and unloading of a reel on the relevant supports.

In a preferred embodiment, said fastening elements are arranged to allow a fastening between said first or second movable carriage and said fixed frame in a substantially vertical direction.

This allows positioning of the movable carriage in a very precise manner with respect to the fixed frame, in particular in the dimensions referred to the horizontal plane.

Preferably, said first and second supports comprise a pair of support rollers, which are idle and capable of receiving in support a hub of said first or second reel, as well as a third roller which is idle and displaceable relative to said pair of support rollers between a locking position, in which said third roller is in abutment against said hub to retain said first or second reel supported on said first or second support, and a release position, in which said third roller is moved away from said hub to allow the displacement of said first or second reel from said first or second support.

In this manner, each reel may be readily and efficiently secured to the support of the movable carriage, ensuring the ability thereof to rotate during the unwinding of the elongate element, or free to be lifted from the respective supports in the loading and unloading step of the reel from the movable carriage.

Preferably, said processing unit comprises a first motor selectively associable with said first or second reel to rotate said first or second reel about said axis of rotation.

In this manner, the rotation of the reel is adequately controlled. Furthermore, the provision of the motor on the processing unit allows provision of a single motor for rotating both the first and second reels.

Preferably, when said first or second movable carriage is associated with said processing unit, said first motor is displaceable away from and towards a coupling element provided on a hub of said first or second reel.

As a result of this feature, adequate kinematic connection is allowed between the motor and reel and, at the same time, there is no obstruction of the movement of the movable carriage, and consequently of the reel mounted thereon, towards and away from the seat provided for the arrangement thereof on the processing unit.

Preferably, said elongate element is wound on said first and second reels in conjunction with a service fabric and separator rollers are arranged on said first and second movable carriages, over which rollers said elongate element and said service fabric are led in order to separate said elongate element from said service fabric.

In this manner, there are prevented phenomena of adhesion between successive turns of elongate elements wound on the reel. Furthermore, the provision of the separator rollers on the movable carriage allows the starting end of the elongate element to be prepared, separating it from the service fabric by the separator rollers before the movable carriage is associated with the processing unit, limiting the time necessary for replacing the movable carriages at the processing unit.

Preferably, there is rotatably mounted on each of said first and second movable carriages a service reel on which said service fabric is wound when separated from said elongate element.

In this manner, once the elongate element wound on the reel is used up, both the reel now empty and the service reel on which the service fabric has been collected can be replaced.

In a preferred embodiment, a coiling member is mounted on each of said first and second movable carriages, the coiling member being enslaved to said service reel to wind said service fabric in successive ordered turns when separated from said elongate element.

In this manner, the collection of the service fabric is carried out in an ordered manner.

Preferably, said processing unit comprises a second motor selectively associable with said service reel to rotate said service reel about an axis of rotation thereof.

In this manner, the rotation of the service reel is adequately controlled. Furthermore, the presence of the motor on the processing unit allows provision of a single motor to rotate the service reel present both on the first movable carriage and on the second movable carriage.

Preferably, when said first or second movable carriage is associated with said processing unit, said second motor is displaceable away from and towards a coupling element provided on a hub of said service reel.

As a result of this feature, adequate kinematic connection is allowed between the second motor and the service reel and, at the same time, the movement of the movable carriage towards and away from the seat provided for the engagement thereof on the processing unit is not obstructed.

Preferably, said coiling member is kinematically connected to said second motor.

This allows correct synchronisation of the axial movement of the coiling member with the rotation of the service reel, controlled by the second motor.

In a preferred embodiment, a temporary bunching system of said service fabric is provided on said first and second movable carriages, between said separator rollers and said service reel.

BRIEF DESCRIPTION OF THE DRAWINGS

The characteristics and advantages of the invention will be appreciated more clearly from the detailed description of a preferred embodiment thereof illustrated by way of non-limiting example with reference to the appended drawings, in which.

DETAILED DESCRIPTION OF THE INVENTION

With reference to the appended Figures, there is generally designated 1 a plant for building a tyre constructed in accordance with the method of the present invention.

Figure 1:
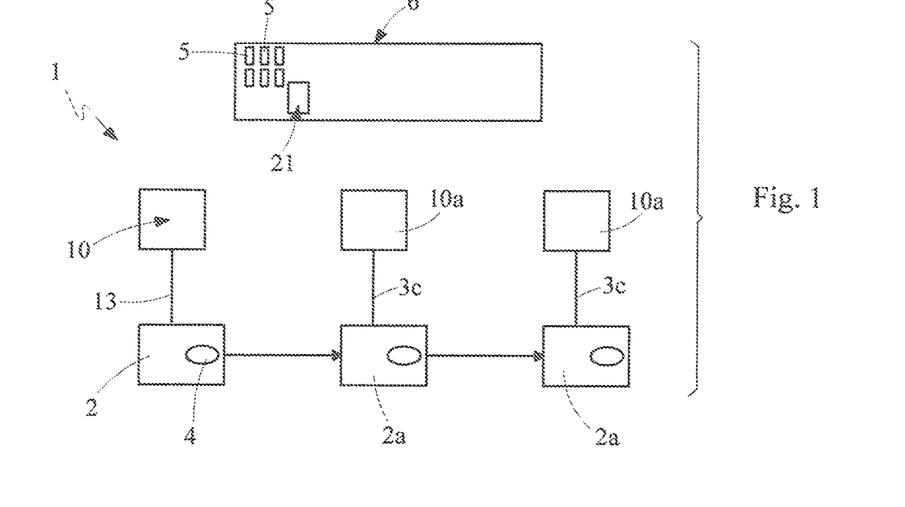
FIG. 1 is a schematic plan view of a plant for building a tyre realized in accordance with the method of the present invention.

The plant 1 comprises a building station 2 in which an elongate element 3 is dispensed on the radially outer surface of a forming drum 4 or a component of the tyre arranged thereon.

The elongate element 3, before being fed to the building station 2, is advantageously wound on reels 5, for example, stored in a suitable storage warehouse 6.

The elongate element 3 is fed to the building station 2, from the reel 5, by means of an unwinding device 10 associated therewith.

In the preferred example described here, the elongate element 3 is a continuous strip of rubber fabric provided with reinforcement cords for forming a component of a belt structure of the tyre being processed. However, the plant 1 may comprise other building stations 2a which are also fed by elongate elements 3c which are also constituted by different materials which are intended to form other components of the tyre being processed. Those elongate elements may be supplied by unwinding devices 10a which are substantially similar to the unwinding device 10 described in detail below.

Figure 2:
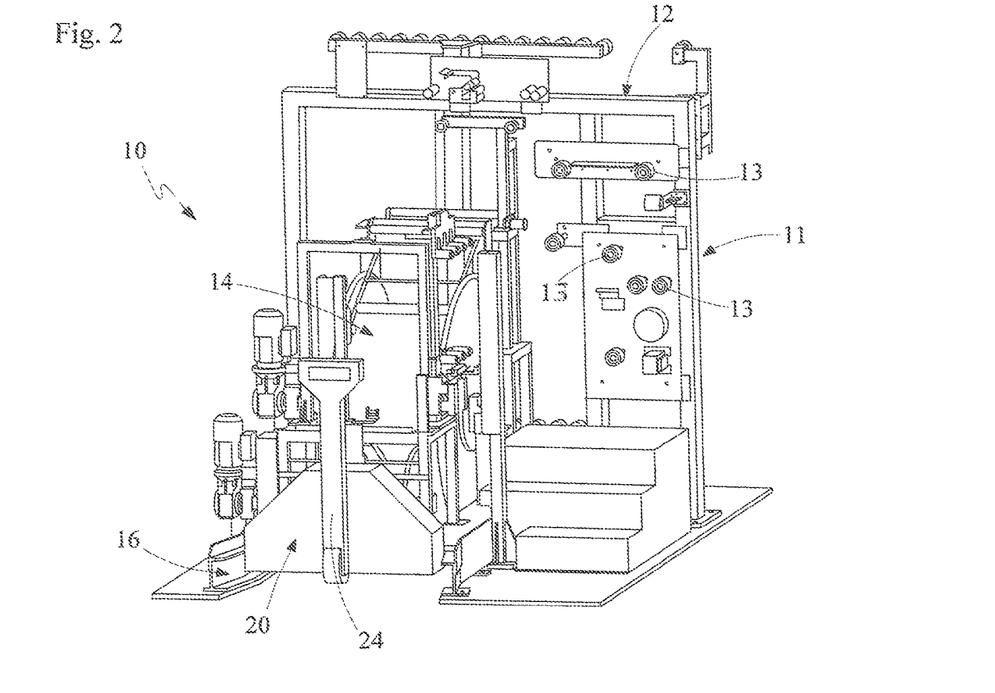
FIG. 2 is a schematic perspective front view of an unwinding device of the processing plant of FIG. 1.
Figure 3:
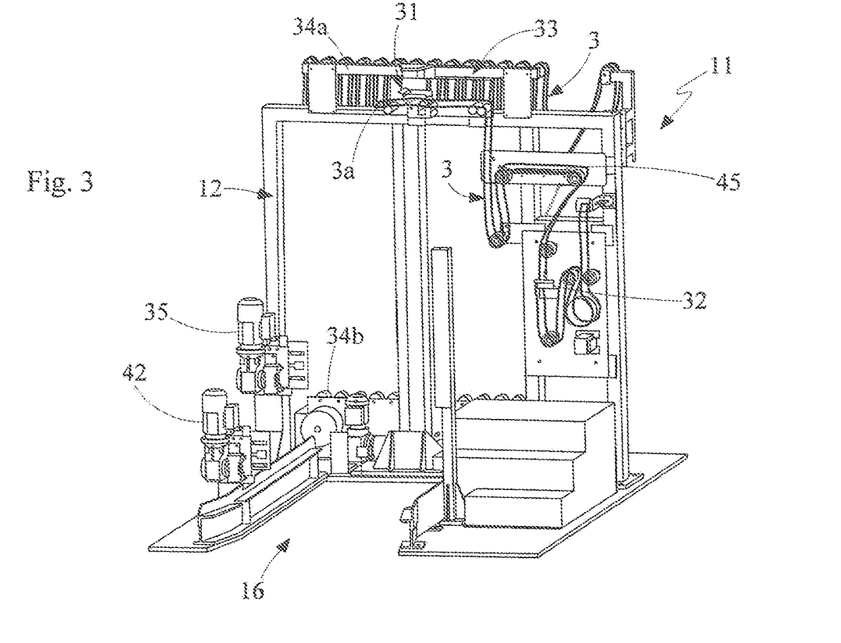
FIG. 3 is a view of a processing unit of the unwinding device of FIG. 2 without any movable carriage.

The unwinding device 10 comprises a processing unit 11 of the elongate element 3, which unit is provided to continuously supply the elongate element 3 to the building station 2. The processing unit 11 comprises a fixed frame 12, to which there are fixed a plurality of rotatable rollers 13, over which the elongate element 3 is directed out of a first reel 14 being processed on the unwinding device 10.

The first reel 14 is mounted, with the ability to rotate about an axis of rotation X thereof, on a first support 15 which, in turn, is received on a first movable carriage 20 which can be associated with the processing unit 11 at a seat 16 defined on the fixed frame 12.

Figure 5:
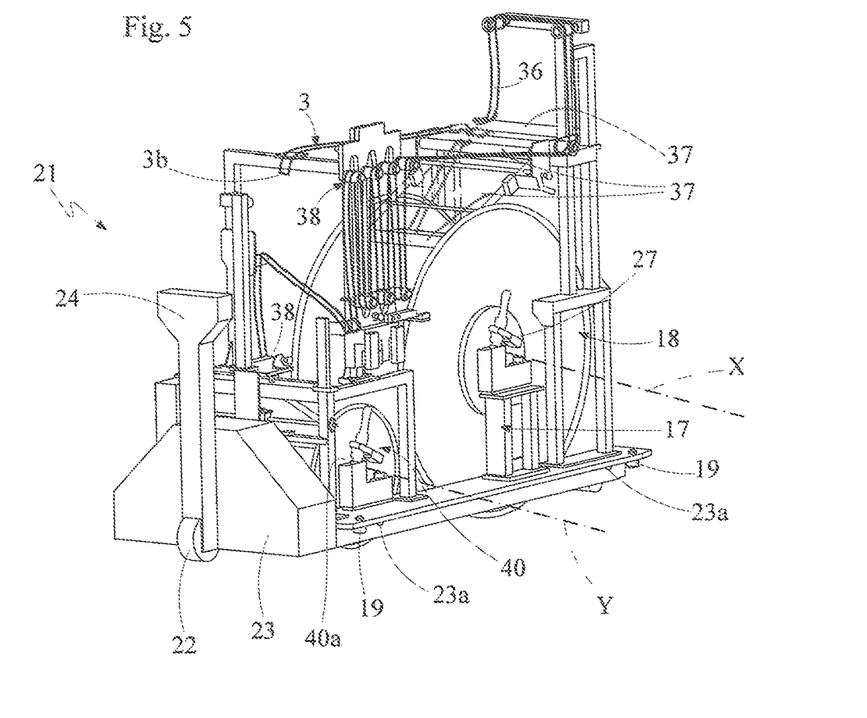
FIG. 5 is a schematic perspective view of a movable carriage of the unwinding device of FIG. 2 in a standby condition.

The unwinding device 10 further comprises a second movable carriage 21, on which there is received a second support 17 for a second reel 18 which can be rotated about an axis of rotation X' thereof, on which the elongate element 3 is wound.

The first and second movable carriages 20 and 21 can be moved independently with respect to the processing unit 11, in particular by both being able to be individually associated therewith one in place of the other, as will be described more clearly below.

Figure 4:
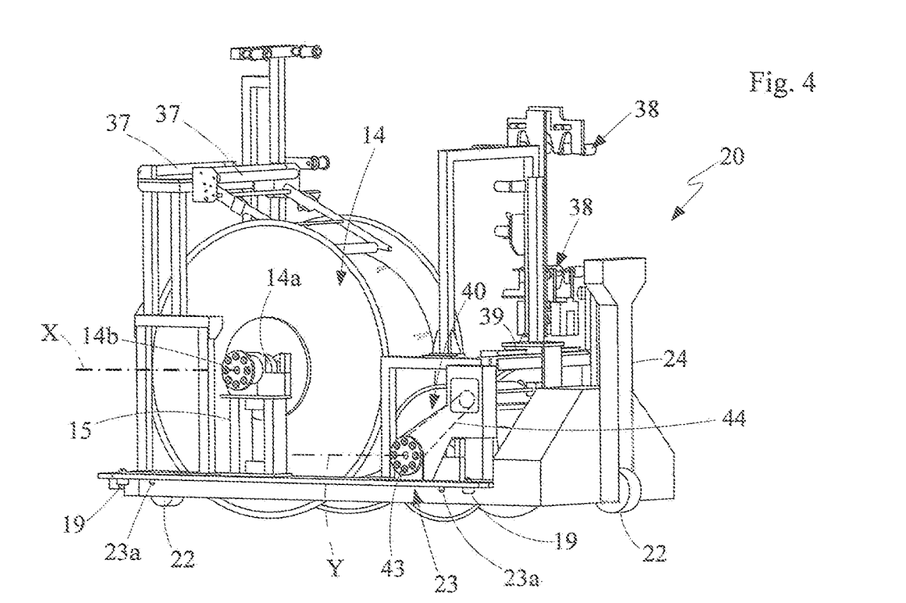
FIG. 4 is a schematic perspective side view of a movable carriage of the unwinding device of FIG. 2 without any elongate element.

There are provided on the first movable carriage 20 guide rollers 19, which have a vertical axis, which are able to abut during rolling the fixed frame 12 in order to guide the first and the second movable carriages 20, 21 during movements towards and away from the seat 16.

The first and the second movable carriages 20 and 21 are constructed in a substantially identical manner so that the detailed description of one of them will also be similarly applicable to the other.

The first movable carriage 20 comprises a plurality of wheels 22 resting on the ground and of which a front wheel is rotatable, a bearing structure 23 on which the first support 15 for the first reel 14 is mounted, and a lifting mechanism for lifting and lowering the bearing structure 23 with respect to the wheels 22.

The lifting mechanism may be of the hydraulic type controlled by a lever 24 which can also be used as a thrust member by the operator.

There are provided on the first movable carriage 20 and on the fixed frame 12 respective fastening elements for removably fixing the first movable carriage 20 to the processing unit 11 inside the seat 16.

Preferably, those fastening elements comprise wedge-shaped couplings 23a which extend from the bearing structure of the first movable carriage 20 in a substantially vertical direction which is perpendicular to the rolling plane of the movable carriage 20 defined by the wheels 22, and corresponding holes or recesses for receiving said wedge-shaped couplings formed on said fixed frame 12. In this manner, the engagement between the first movable carriage 20 and the fixed frame 12 is brought about by inserting the wedge-shaped couplings in the corresponding holes or recesses in a substantially vertical direction.

Figure 6:
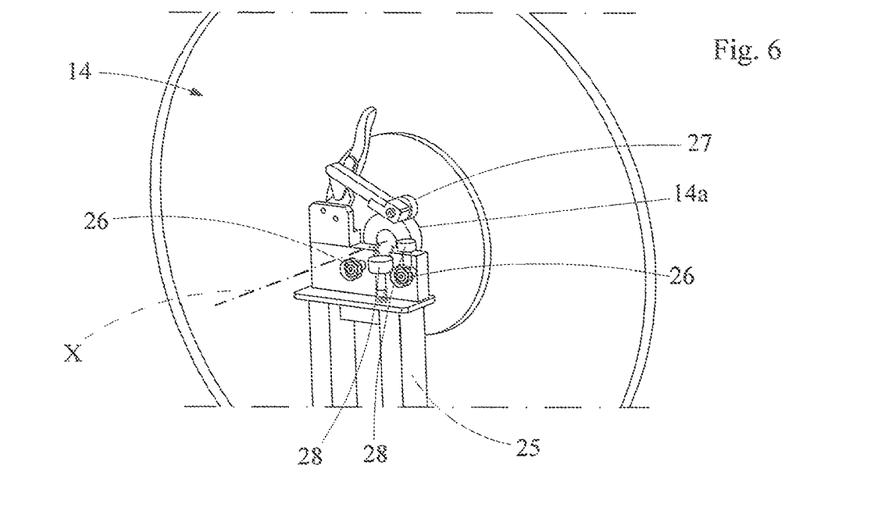
FIG. 6 is a schematic view of a detail of the movable carriage of FIG. 4.

The first support 15 comprises a pair of vertical uprights 25 which are mutually spaced apart and at the top of which there are provided a pair of support rollers 26 which are idle and which are capable of receiving in support a hub 14a of the first reel 14, as well as a third roller 27 which is idle and which can be moved with respect to the pair of support rollers 26, by means of a lever 27a, between a locking position in which the third roller 27 is in abutment against the hub 14a in order to retain the first reel 14 in abutment on the first support 15 and a release position in which the third roller 27 is moved away from the hub 14a in order to allow the movement of the first reel 14 away from the first support 15. The support rollers 26 and the third roller 27 have a horizontal axis so as to be substantially parallel with the axis of rotation X of the first reel 14. Additional rollers 28 having a vertical axis are further mounted at the top of each upright 25 in order to centre axially the first reel 14 with respect to the first support 15.

The processing unit 11 comprises a mechanism for locking the elongate element 3 provided to lock a terminal end 3a of the elongate element 3 exiting the first reel 14, comprising a detection member 31 for the terminal end 3a and a locking jaw 32 which is positioned downstream of the detection member 31 and which is provided to lock the elongate element which slides through it at the time when the detection member 31 detects the terminal end 3a.

The processing unit 11 further comprises a temporary bunching system 33 of the elongate element 3 which is positioned downstream of the locking mechanism and which can allow the continuous supply of the elongate element 3, even when the sliding of the end portion thereof is locked by the locking mechanism.

The temporary bunching system 33 comprises a plurality of idle rollers which are arranged in two parallel rows 34a and 34b, on which the elongate element 3 is alternately directed between a roller of one row to a roller of the other row in a zigzag course. The rows 34a and 34b can be moved towards each other in such a manner that the total length of the elongate element arranged on the temporary bunching system 33 may be advantageously varied.

The processing unit 11 further comprises a first motor 35 which can be selectively associated with the first reel 14 in order to rotate it about the axis of rotation X. The first motor is fixed to the fixed frame 12 at the seat 16 and can be moved towards and away from the seat 16 in such a manner as to engage (or release) a coupling element 14b provided on the hub 14a of the first reel 14.

The elongate element 3 wound on the first reel 14 is coupled to a service fabric 36 and there are provided on the first movable carriage 20 separator rollers 37, through which the elongate element 3 and the service fabric 36 are led in order to separate them from each other.

Downstream of the separator rollers 37, the elongate element 3 and the service fabric 36 follow an independent course so that, while the elongate element 3 continues on its own course in the processing unit 11, as described above, the service fabric 36 carries out its own course inside the first movable carriage 20.

In particular, the service fabric 36 is led through a temporary bunching system 38 which is substantially similar to the temporary bunching system 33 of the elongate element 3 described above, but which is provided on the first movable carriage 20. Following the passage through the bunching system 38, said service fabric 36 is wound by means of a coiling member 39 on a service reel 40 which is also mounted for rotation on the first movable carriage 20.

The service reel 40 is positioned parallel with the first reel 14 and in a retracted position with respect to the processing unit 11 and is mounted on a support 41 which is substantially similar to the first support 15 in such a manner as to be able to rotate about its own axis of rotation Y.

There is provided on the processing unit 11, preferably at the same side as the first motor 35, a second motor 42 which may be selectively associated with the service reel 40 in order to control it in rotation about the axis of rotation Y thereof.

Similarly to the first motor 35, the second motor 41 is also movable towards and away from the seat 16, respectively, in order to release or engage a coupling element 43 provided on a hub 40a of the service reel 40.

The coiling member 39 is moved in translation with an alternating direction in the axial dimension of the service reel 40 in order to wind in successive turns the service fabric 36 on the service reel 40. That movement is controlled by the second motor 42 to which it is kinematically connected by means of a transmission 44, for example, of the type having a belt or chain.

As said above, the second movable carriage 21 on which the second reel 18 is mounted is generally similar to the first movable carriage 20 and therefore the same reference numerals will be used for the structural components thereof as were used for the first movable carriage 20.

Whilst the first movable carriage 20 is engaged on the processing unit 11 in order to unwind the elongate element 3 from the first reel 14, the second movable carriage 21 is kept in a standby condition ready to be engaged in turn with the processing unit 11 in place of the first movable carriage.

In this condition, the starting end 3b of the elongate element wound on the second reel 18 is advantageously withdrawn from the second reel 18 and led through the separator rollers 37, where the service fabric 36 is uncoupled from the elongate element, and prepared for the subsequent step of connection to the final end 3a of the elongate element wound on the first reel 14.

However, the service fabric 36 is led through the temporary bunching system 38, the coiling member 39 and then partially wound on the service reel 40.

The second movable carriage 21, in a standby condition, may also be kept in the storage warehouse 6 and moved to the unwinding device 10 only at the appropriate time.

When the terminal end 3a of the elongate element 3 wound on the first reel 14 leaves the reel, said end 3a is detected by the detection member 31 which provides for closing the locking jaw 32, thereby blocking the travel of the elongate element 3 along the processing unit 11. The building station 2 is meanwhile supplied by the elongate element 3 which is present in the temporary bunching system 33.

At this time, after moving away the first and second motors 35, 42 from the respective coupling elements 14b and 43, thereby disengaging the first reel 14 and the service reel 40, the bearing structure 23 of the first movable carriage 20 is lifted off the ground by means of the lever 24, disengaging the first movable carriage 20 from the fixed frame 12 of the processing unit 11.

The first movable carriage 20 is then moved away from the seat 16, leaving the position for the second movable carriage 21, which is immediately moved inside the seat 16 and, after correct positioning and engagement on the fixed frame 12, the starting end 3b of the elongate element 3 which is wound on the second reel 18 is joined to the terminal end 3a of the elongate element 3 previously wound on the first reel 14, temporarily locked by the locking mechanism.

The connection between the two ends is brought about on a ledge 45 which is suitably arranged on the processing unit 11 between the detection member 31 and the locking jaw 32.

Meanwhile, the first and second motors 35, 42 are moved towards the seat 16 so as to engage the second reel 18 and the service reel 40 which are mounted on the second movable carriage 21 at the respective coupling elements 14b and 43.

With the connection complete, the locking jaw 32 is released; the second reel 18 and the service reel 40 are set in rotation about the respective axes so as to start the unwinding of the elongate element wound on the second reel 18 and, at the same time, to wind the service fabric 36 on the service reel 40.

That replacement operation of the first movable carriage 20 with the second movable carriage 21 is carried out within a time shorter than the emptying time of the temporary bunching system 33 so as not to impair the supply to the building station 2.

The first movable carriage 20 is then directed to the storage warehouse 6 where there are unloaded the first reel 14, now empty, and the service reel 40 on which the service fabric 36 corresponding to the elongate element unwound from the first reel 14 has been collected.

Subsequently, a new reel on which the elongate element and a new empty service reel intended for collecting the corresponding service fabric are loaded on the first movable carriage 20.

Naturally, a person skilled in the art could apply additional modifications and variations to the invention described above in order to comply with specific and contingent application requirements, which variations and modifications are still included in the scope of protection as defined by the appended claims.

The invention claimed is:

1. A method for managing the continuous feeding of an elongate element wound on reels to a station for building a tyre, wherein said elongate element is continuously supplied from a processing unit of an unwinding device of successive reels, and wherein, when a terminal end of said elongate element wound on a first reel leaves said first reel, the method comprising:
   moving said first reel away from said unwinding device on a first movable carriage;
   positioning a second reel, which is successive to the first reel and mounted on a second movable carriage, in place of said first reel; and
   joining said terminal end of the elongate element previously wound on said first reel to a starting end of the elongate element wound on said second reel;
   and wherein said first and second movable carriage are associated with said processing unit by removably fixing said first and second movable carriages at a seat of a fixed frame of said processing unit by respective fastening elements provided on said first and second movable carriages and on said fixed frame.

2. The method according to claim 1, wherein, prior to exit of said terminal end, said elongate element unwound from said first reel fills a temporary bunching system positioned upstream of said building station.

3. The method according to claim 2, wherein, at the exit of said terminal end, said elongate element, unwound from said first reel, is locked at said terminal end, and said building station is supplied by said temporary bunching system.

4. The method according to claim 3, wherein said terminal end of the elongate element exiting said first reel is joined to said starting end of the elongate element wound on said second reel in a time shorter than a time for emptying said temporary bunching system.

5. The method according to claim 1, wherein said first and second reels are mounted and dismounted on said first and second movable carriages, respectively, in a storage warehouse for said reels.

6. The method according to claim 1, wherein said elongate element wound on said first or second reel is coupled to a service fabric, and wherein said service fabric is separated from said elongate element, once unwound from said first or second reel, at said first or second carriage.

7. The method according to claim 6, wherein said service fabric, after being separated from said elongate element, is wound on a service reel mounted on said first or second carriage, respectively.

8. An unwinding device of an elongate element wound on a reel for building tyres, comprising:
   a first support for a first reel on which said elongate element is wound, said first support allowing rotation of said first reel about an axis of rotation thereof;
   a processing unit of said elongate element, said unit being arranged to continuously supply said elongate element to a building station of said tyre, said processing unit comprising:
      i) a plurality of rotating rollers over which said elongate element is led in exit of said first reel;
      ii) a locking mechanism of said elongate element arranged to lock a terminal end of said elongate element at the exit of said first reel; and
      iii) a temporary bunching system for said elongate element adapted to allow continuous supplying of said elongate element, while said terminal end is locked and is joined to a starting end of said elongate element wound on a second reel supported by a second support which allows rotation of said second reel about an axis of rotation thereof;
   wherein said first and second supports for said first and second reels are housed on a first and a second movable carriage, respectively, which can be individually associated with said processing unit and moved independently with respect thereto;
   wherein said first and second movable carriages can be associated with said processing unit at a seat defined on a fixed frame of said processing unit; and
   wherein said respective fastening elements are provided on said first and second movable carriages and said fixed frame for removably fixing said first and second movable carriages to said processing unit at said seat.

9. The unwinding device according to claim 8, wherein said fastening elements comprise wedge-shaped couplings.

10. The unwinding device according to claim 8, wherein guide rollers are provided on said fixed frame or on said first or second movable carriage to guide said first and second movable carriages away from and toward said seat.

11. The unwinding device according to claim 8, wherein said first and second movable carriages comprise a plurality of wheels resting on ground, a bearing structure on which the first or second support for said reels are mounted, as well as a lifting mechanism for lifting and lowering said bearing structure relative to said wheels.

12. The unwinding device according to claim 8, wherein said fastening elements are arranged to allow a fastening between said first or second movable carriage and said fixed frame in a substantially vertical direction.

13. The unwinding device according to claim 8, wherein said first and second supports comprise a pair of support rollers, which are idle and adapted to receive in support a hub of said first or second reel, as well as a third roller which is idle and displaceable relative to said pair of support rollers between a locking position, in which said third roller is in abutment against said hub to retain said first or second reel supported on said first or second support, and a release position, in which said third roller is moved away from said hub to allow displacement of said first or second reel from said first or second support.

14. The unwinding device according to claim 8, wherein said processing unit comprises a first motor selectively associable with said first or second reel to rotate said first or second reel about said axis of rotation.

15. The unwinding device according to claim 14, wherein, when said first or second movable carriage is associated with said processing unit, said first motor is displaceable away from and toward a coupling element provided on a hub of said first or second reel.

16. The unwinding device according to claim 8, wherein said elongate element is wound on said first and second reels in conjunction with a service fabric and separator rollers are arranged on said first and second movable carriages, over which rollers said elongate element and said service fabric are led in order to separate said elongate element from said service fabric.

17. The unwinding device according to claim 16, wherein there is rotatably mounted on each of said first and second movable carriages a service reel on which said service fabric is wound when separated from said elongate element.

18. The unwinding device according to claim 17, wherein a coiling member is mounted on each of said first and second movable carriages, the coiling member being enslaved to said service reel to wind said service fabric in successive ordered turns when separated from said elongate element.

19. The unwinding device according to claim 18, wherein said processing unit comprises a second motor selectively associable with said service reel to rotate said service reel about an axis of rotation thereof.

20. The unwinding device according to claim 19, wherein, when said first or second movable carriage is associated with said processing unit, said second motor is displaceable away from and toward a coupling element provided on a hub of said service reel.

21. The unwinding device according to claim 19, wherein said coiling member is kinematically connected to said second motor.

22. The unwinding device according to claim 17, wherein a temporary bunching system of said service fabric is provided on said first and second movable carriages, between said separator rollers and said service reel.

23. A plant for building a tyre, comprising:
   a building station, wherein an elongate element is applied to a radially outer surface of a forming drum or of a component of said tyre arranged on said forming drum; and
   an unwinding device according to claim 8, associated with said building station for unwinding said elongate element from reels arranged in succession and continuously feeding said building station.

\* \* \* \* \*